United States Patent [19]

Little

[11] 4,189,125
[45] Feb. 19, 1980

[54] GROUND SUPPORT PADS FOR MOBILE STRUCTURES

[76] Inventor: Jim E. Little, P.O. Box 87, Blanco, Tex. 78606

[21] Appl. No.: 967,604

[22] Filed: Dec. 8, 1978

[51] Int. Cl.$^2$ .................... A47B 91/00; B65D 9/00
[52] U.S. Cl. .................... 248/346; 52/169.1;
 52/292; 52/309.1; 52/569; 108/901; 108/902
[58] Field of Search .................... 248/346, 346.1, 633;
 52/309, 569, 570, 660, 309.1, 169.1, 292;
 428/53, 178, 116, 290, 286; 264/211; 108/56.1,
 901, 902

[56] References Cited

U.S. PATENT DOCUMENTS

| 3,616,111 | 10/1971 | Raech .................... 428/53 |
| 3,664,271 | 5/1972 | Wolder .................... 108/901 |
| 3,824,933 | 7/1974 | Lind .................... 108/902 |
| 3,902,692 | 9/1975 | Skinner .................... 248/346 |
| 3,949,134 | 4/1976 | Willdorf .................... 428/458 X |
| 4,015,545 | 4/1977 | Kurokawa .................... 312/257 R |
| 4,054,713 | 10/1977 | Sakaguchi et al. .................... 428/290 X |

FOREIGN PATENT DOCUMENTS 2530588  1/1976 Fed. Rep. of Germany .......... 108/901
2655593  6/1977 Fed. Rep. of Germany .......... 108/56.1

Primary Examiner—James T. McCall
Attorney, Agent, or Firm—Gunn & Lee

[57] ABSTRACT

A ground support pad is described which is typically composed of a polyolefin-homopolymer and consists of two separate and identical halves which may be snapped together to form an integral unit. The pads may be used to support any heavy structure upon the ground, but is most useful in supporting structures such as mobile homes. An injection mold process is utilized in manufacturing the pad. The pad, while presenting an apparently solid appearance, is comprised internally of a cross support type design. The pad provides a lightweight, durable, reusable support for mobile home piers. The pad may be sold with a mobile home, used to support the mobile home at its first location, and subsequently transported with the mobile home and reused to support the mobile home at subsequent locations.

8 Claims, 4 Drawing Figures

GROUND SUPPORT PADS FOR MOBILE STRUCTURES

BACKGROUND OF THE INVENTION

This invention relates to ground support pads and, more particularly, to ground support pads designed to support the steel piers or concrete block supports typically found beneath most mobile homes in the United States. Ground support pads are necessary in order to help prevent a mobile home from becoming unlevel or overturning due to shifting loads, high winds, or heavy rains.

Mobile homes typically, though not invariably, have wheels and are towed to their intended location. Once upon location, mobile homes are steadied by securing them to the earth by means of cables, stakes, anchors and other implements which are used to pull the mobile home tightly against the earth. For such anchors to be effective, however, the mobile home must be prevented from merely sinking into the earth, rather than being steadied upon it. To this end, piers or supports are set up beneath the mobile home. Ground support pads are placed beneath these piers and supports to broaden their base. This is often necessary because of loose soil conditions, adverse weather and other difficulties outlined above.

More and more American families own mobile homes, and thus a large market exists for specialized ground support pads. The need for properly designed and constructed pads is evidenced by the growing number of governmental regulations concerning such pads.

BRIEF DESCRIPTION OF THE PRIOR ART

While many ground support pads for mobile homes are currently being sold and used in the mobile home market, none of them combine the attributes of lightweight structure, a large base area to height ratio, durability and reusability, together with a design which may be manufactured effectively and inexpensively. to subsequent mobile home location. Concrete pads usually do not contain steel reinforcement and as a result crack very easily. Concrete ground support pads are very expensive to manufacture, transport, and store. Furthermore, weathering effects such as a repetitive freeze-thaw cycle and/or stresses due to transportation, installation, or abnormal pressures frequently crack the concrete pads. The result is that the mobile home piers may suddenly plunge into the earth under stress such as occurs during a storm and the mobile home together with the family residing therein upset and toppled.

While the current wooden ground support pads and concrete support pads meet present regulations imposed by the different governmental entities involved, it is believed that due to the difficulties outlined above, future governmental regulations will require that safer and more durable ground support pads for a mobile homes be developed and marketed.

SUMMARY OF THE INVENTION

The present invention utilizes construction and engineering which is new and novel in the ground support pad industry. As is typical with all ground support pads, the present ground support pad is placed directly upon the ground and is designed and constructed to prevent piers or heavy objects placed upon the pad from penetrating into the earth.

It is an object of the present invention to provide a ground support pad for mobile structures which will furnish a more reliable and usable product in terms of handling, transportation, installation, stocking, and durability. It is believed that the present invention meets these objectives by combining a structure unique to the ground support pad industry with a material unique to the ground support industry. This combination satisfies a long-felt need within the ground support pad industry.

It is another object of the present invention to provide a ground support pad which may be reused at subsequent locations after having previously been used to support heavy structures at former locations.

It is another object of the present invention to provide a ground support pad of sufficient durability to relieve mobile home owners of the necessity of replacing ground support pads prior to the mobile home itself deteriorating beyond usefulness due to old age. This is accomplished by using sufficient quantities of long-lived materials, which materials both resist weathering and are yet serviceable for supporting a heavy structure.

It is yet another object of the present invention to produce a ground support pad which, when installed upon rocky soil, loose soil, or any other supporting medium, can withstand abnormal pier loads. This is accomplished by providing a flexible ground support pad which covers a broad surface area of the supporting medium (normally the earth), and which is extremely resistant to puncture or tearing. Such a ground support pad would diffuse the pier load pressure over a larger surface area of earth than the surface area by which the pier alone would be supported.

It is yet another object of the present invention to provide an extremely lightweight and compact ground support pad which may be usefully transported by the mobile home owner from mobile home site to subsequent mobile home site.

DESCRIPTION OF THE PREFERRED EMBODIMENT

Figure 1:
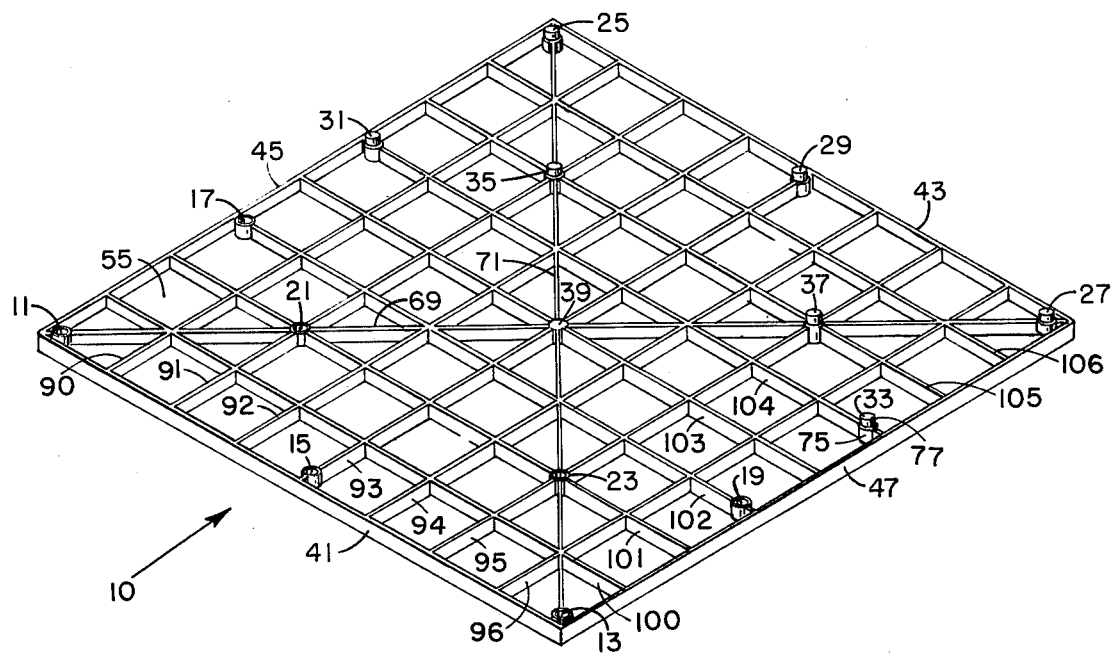
FIG. 1 is a perspective view of a first half of the present invention.

Referring now to FIG. 1 of the drawings, there is shown a first half 10 of the ground support pad 9 of the present invention. The first half 10 of the ground support pad 9 consists of an injection mold formed polyolefin-homopolymer in a flat, square configuration. The outer edges of the first half 10 of ground support pad 9, sides 41 and 43 (longitudinal sides) are parallel to each other and sides 45 and 47 (latitudinal sides) are parallel to each other. Furthermore, sides 41 and 43 are perpendicular to sides 45 and 47. In the preferred embodiment, the height of sides 41, 43, 45 and 47 is approximately ¼" while the length of each such side is approximately 16". Each of the sides 41, 43, 45 and 47 are formed integral with base 55. A view of the outer surface of base 55a is shown more fully in FIG. 2, base 55a of the second half 10a corresponding to base 55 of the ground support pad 9 of the first half 10. The inner surface of the base 55 of the first half 9 is shown in FIG. 1 The base 55 essentially consists of a flat polyolefinhomopolymer approximately 1/16 inch thick. The ¼" height of sides 41, 43, 45 and 47 is determined by including the width of the base 55. In alternative embodiments, the total size of the present invention and the ratio of width to length of the present invention may be varied according to different types of piers, different types of weight loads, and different types of soil which may be encountered.

The upper elevated view in FIG. 1 of a first half 10 of the ground support pad 9 shows the cross rib support of the internal portion of the ground support pad 9. This is due to the confluence of ribs 90–96 and 100–106 within the first half 10 of the ground support pad 9, which ribs 90–96 are perpendicular to the ribs 100–106. Ribs 90–96 extend from side 41 to side 43 of the first half 10 of the ground support pad 9, while ribs 100–106 extend from side 45 to side 47. The preferred embodiment utilizes seven latitudinal ribs 100–106 running in the directions ascribed above.

The first half 10 of the ground support pad 9 further contains two diagonal ribs 69 and 71. Diagonal rib 69 runs from the corner defined by side 41 and side 45 to the corner defined by side 43 and side 47. Diagonal rib 71 runs from the corner defined by side 41 and side 47 to the corner defined by side 45 and side 43. These diagonal ribs 69 and 71 intersect at the center point 39 of the first half 10 of the ground support pad 9. Diagonal rib 59 is perpendicular to diagonal rib 71. Also intersecting at said center point 39 are ribs 93 and 103. Thus, the center point 39 appears to have eight spokes radiating from it to outer points of the ground support pad 9. Due to this convergence of ribs at the center point 39, the area of the first half 10 of the ground support pad 9 located near the center point 39 is the strongest portion of the first half 10 of the ground support pad 9. Consequently, in use, the steel pier of the supported mobile home is placed near the center point 39.

The first half 10 of the ground support pad 9 also contains male interlocks 25, 27, 29, 31, 33, 35, and 37, and female interlocks 11, 13, 17, 19, 21, 23. The first corner male interlock 25 is located slightly within the corner of the first half 10 of the ground support pad that is defined by the intersection of side 43 and side 45. The second corner male interlock 27 is located sightly within the corner defined by side 43 and side 47. The outer male interlocks 31 and 33 are both located upon rib 104 and slightly within side 45 and side 47, respectively. First inner male interlock 35 is located at the juncture of rib 105 and rib 91. Second inner male interlock 37 is located at the juncture of rib 105 and rib 95.

The female interlocks are likewise located. First corner female interlock 11 is located slightly within the corner defined by side 41 and side 45. Second corner female interlock 13 is slightly within the corner defined by side 41 and side 47. Outer female interlocks 17 and 19 are both located upon rib 102 and slightly within side 45 and side 47, respectively. For the purposes of clarity, the term "within" shall refer to whichever side of the reference point which is closer to the ground support pad 9 center point 39. The term "lower" shall refer to whichever portion of the ground support pad 9 which is closest to the ground. The first inner female interlock 21 is located at the juncture of ribs 101 and 94. The second inner female interlock 23 is located at the juncture of ribs 101 and 95.

While all of the above interlocks are located upon at least one rib, none of the above interlocks are located upon a side of the first half 10 of the ground support pad 9.

Figure 2:
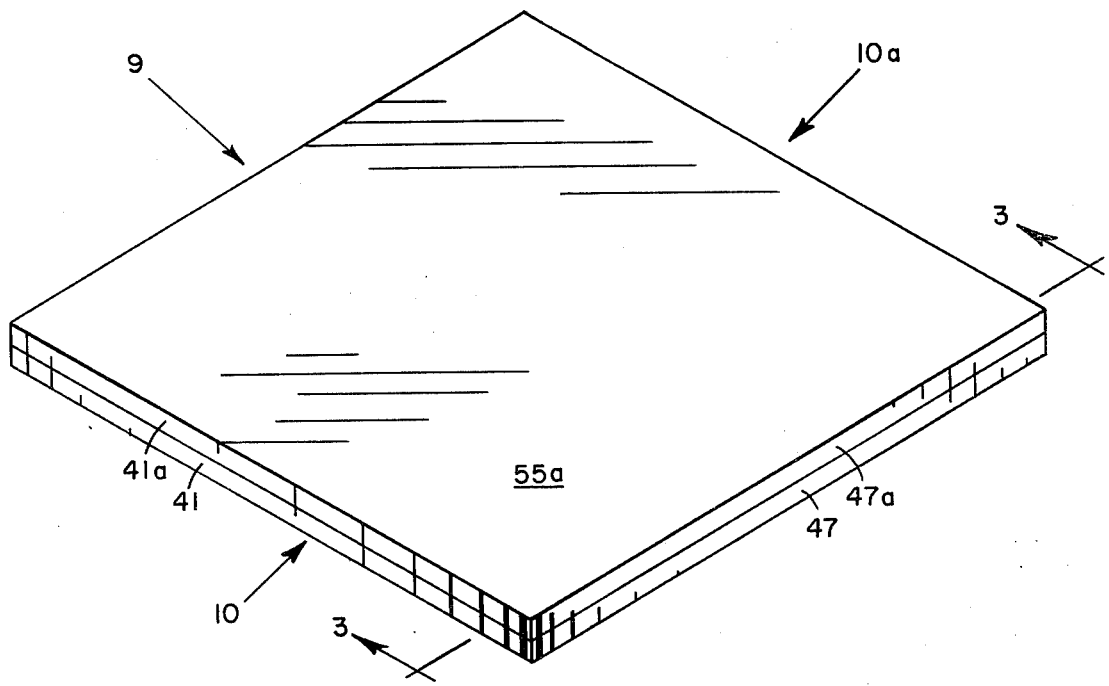
FIG. 2 is a perspective, assembled view of the present invention with a first half and a second half of the ground support pad having been engaged to form a complete ground support pad.
Figure 3:
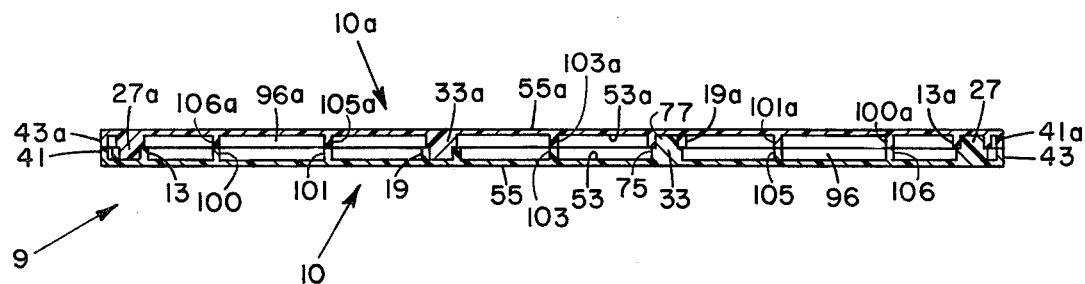
FIG. 3 is a cross-sectional view of FIG. 2 along section lines 3—3.

Referring now to FIGS. 2 and 3, a complete ground support pad 9 is shown in which the first half 10 of the ground support pad 9 is shown engaged upon and within the second half 10a of ground support pad 9. The first half 10 of the ground support pad 9 is located upon the ground while the second half 10a of the ground support pad 9 is engaged upon the upper side of the first half 10 of the ground support pad 9. FIG. 3 is a cross-sectional view showing the internal structure of the complete ground support pad 9 as seen along section line 3—3 of FIG. 2. The two halves of the ground support pad 9, first half 10 and second half 10a, are identical to each other with the letter "a" and identical numbers being used to designate the elements of the second half 10a. FIG. 3 shows that when reversed the interlocks 27a, 33a, 19a, and 13a of second half 10a of the ground support pad 9 engage either within or upon interlocks 13, 19, 33, and 27, respectively, of the first half 10 of the ground support pad 9. The same result occurs regarding all other innerlocks of both the first half 10 of the ground support pad 9 and the second half 10a of the ground support pad 9, each male interlock engaging within a female interlock and each female interlock being engaged upon a male interlock. Once the two halves 10 and 10a are combined in this fashion, a complete ground support pad 9 has been formed. Such a complete ground support pad 9 is shown in FIG. 2.

Outer male interlock 33 as shown in FIGS. 1 and 3 shows the male interlock support 75 and the male interlock projection 77 of the outer male interlock 33. FIG. 3 shows the male projection 77 of outer male projection 33 securely fastened within outer female interlock 19a of the second half 10a of the ground support pad 9. FIG. 3 also shows that each rib 100–105 of first half 10 of the ground support pad 9 abuts directly against and directly supports the corresponding ribs 100a–105a of the second half 10a of the ground support pad 9. Rib 90 of the first half of the ground support pad 9 abuts directly against and supports rib 96a. Likewise all other ribs 90–96 of first half 10 of the ground support pad 9 also abut and support each rib 90a–96a of second half 10a of the ground support pad 9. It is thus seen from FIGS. 1 and 3 that much time and care was expended in the invention and construction of a first half 10 of the ground support pad 9 to enable it to engage each interlock and support each rib of its identical second half 10b of ground support pad 9 to form a complete ground support pad 9.

As is shown by comparing FIG. 1, FIG. 2, and FIG. 3, the combination of the first half 10 and second half 10a of the ground support pad 9 creates a pad which appears to be solid, but which in fact is composed of a honeycomb-type structure of cells, each cell either being described and bounded by ribs 90–96 and 100–106 or by ribs 90–96 and 100–106 in conjunction with one or more of the sides 41, 43, 45, and 47. Because of the cross rib or honeycomb-like structure, the ground support pad 9 is able to withstand greater pressures upon the ground support pad 9 than would be possible without the honeycomb-type structure. Furthermore, due to this structure, the expense and weight of the ground support pad 9 are drastically reduced. It is only because of the decreased weight and expense, yet increased strength that the ground support pad 9 can practicably be produced and sold in the ground support pad market.

Figure 4:
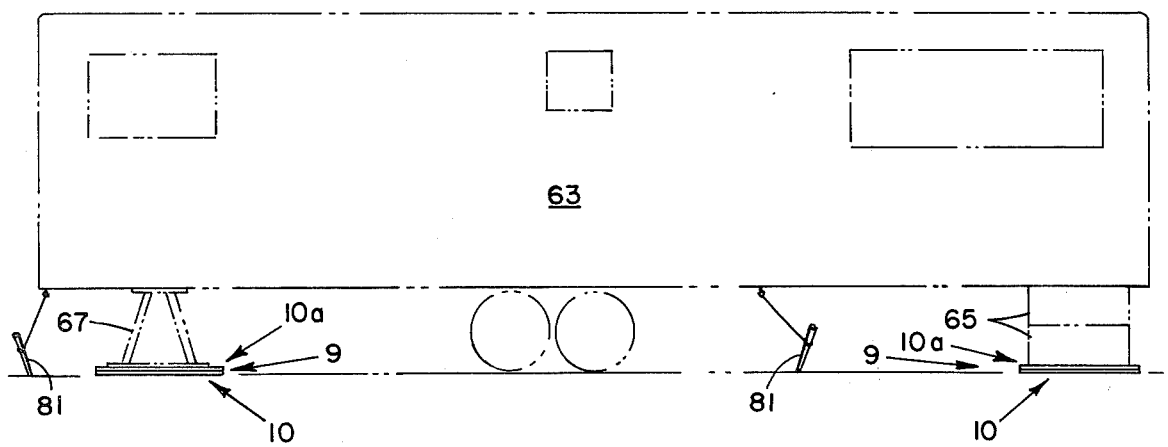
FIG. 4 is an environmental view of the present invention being used to support a mobile home.

FIG. 4 shows the placement of the ground support pad 9 as it is used. Mobile home 63 is supported by concrete blocks 65 or steel pier 67, both being common in the industry. In either case, the ground support pad 9 is adapted to successfully withstand the pressure conducted by the concrete blocks 65 or steel piers 67 to the ground support pad 9. Without the ground support pads 9, the concrete blocks 65 and/or steel piers 67 could sink into the soft earth, and thus upset the mobile home 63. The pressure upon the ground support pad 9 is further accentuated by the use of anchoring devices 81, which secure the mobile home the ground. Furthermore, there are often abnormal pressures upon the ground support pad 9 due to storms or shifting weight of the mobile home 63. Additionally, a large surface area ground support pad 9 is necessary to maintain concrete block 65 and steel pier 67 supports because during periods of heavy rain a small supporting base may have its supporting earth eroded from under it, again resulting in possible upset of the mobile home 63.

As shown in FIG. 2, the outer surface of the base 55a of the second half 10a of the ground support pad 9 is purposely made rough during the manufacturing process as is the outer surface of base 55 of the first half 10 of ground support pad 9. This is done so that the steel piers 67 will not slip off of the ground support pad 9.

The ground support pad 9 is manufactured by an injection molding process, the base material being a fill grade of a polyolefin-homopolymer. Added to this base is a blended percentage of stranded fiber for strength, which fiber strand lengths will usually not exceed 0.250 of an inch in length. This fiber strand is dispersed uniformly throughout the ground support pad. The melt index of this base material ranges from 4.5 to 10, and the density will normally be 0.910 to 0.935 using ASTM tests as the standard of measure. A special ultraviolet inhibitor is added using an unfilled polyolefin as its basic carrier. The inhibitor and its carrier constitute approximately 4% of the finished product. The material is automatically gas relieved using the material manufacturers' recommendation.

The use of this base material is important for many reasons. It is flexible enough to conform to rocky projections from the earth as are encountered at some mobile home sites and to resist cracking. On the other hand, the base material is sufficiently rigid to prevent steel piers from puncturing the pad. The base material also resists weathering, which would defeat wooden or concrete pads within a few years. Further, the selected material is not prohibitively expensive in the quantities required by the present invention.

It is thus seen that a new and novel type of ground support pad has been invented which meets the objectives outlined above. The reversible structure utilized by the halves 10 and 10a of the ground support pad 9 allows the entire manufacture of the ground support pad 9 to be conducted through the use of only one set of dies. Furthermore, because both halves 10 and 10a are identical, the process of storage, distribution, accounting, and ultimate assembly is vastly simplified. The honeycomb-type structure is necessary because it allows the ground support pad to be produced with approximately one-third of the material which would be necessary to produce a like solid ground support pad. Such a solid ground support pad, if composed of the quality materials embodied within the described preferred embodiment, would be prohibitively expensive.

I claim:

1. A ground support pad comprising:
   a first ground support pad half and a second ground support pad half which are separate and identical;
   an equal number of male interlocks and female interlocks, each said male interlock and each said female interlock being designed and constructed to form an intergral unit when the male interlock is engaged within the female interlock, such said integral unit providing maximum vertical support within said ground support pad and also securing said first ground support pad half to the second ground support pad half such that any movement between the two ground support pad halves is prevented, said interlocks being located upon each of said ground support pad halves so that said first ground support pad half may be reversed in relation to said second ground support pad half and engaged thereon by means of said interlocks to form a complete ground support pad;
   latitudinal sides and longitudinal sides of said ground support pad, said latitudinal sides and said longitudinal sides being arranged to form a square;
   latitudinal ribs and longitudinal ribs located within each ground support half, all said latitudinal ribs being perpendicular to all said longitudinal ribs, and all said latitudinal ribs and all said longitudinal ribs being equidistantly spaced in relation to each other so that all said ribs together form a systematic lattice structure within said ground support pad, longitudinal and latitudinal ribs being located upon each said ground support pad half so that when said ground support pad halves are engaged, each said rib of each said ground support pad half abuts squarely against a rib of the other said ground support half, said ribs being designed, constructed, and located to prevent said ground pad from tearing due to stress and to diffuse stress upon any portion of said ground support pad to all portions of said ground support pad; and
   two diagonal ribs located within each ground support half, said diagonal ribs being perpendicular to each other, said two diagonal ribs being formed within said first and second ground support pad halves so that upon engagement of said first ground support pad half with said second ground support pad half said diagonal ribs of said first ground support pad half abut squarely against said diagonal ribs of said second ground support pad half, said diagonal ribs being designed, constructed, and located to provide additional support for a center portion of said ground support pad, said diagonal ribs being located upon each said ground support pad half so that when said ground support pad halves are engaged, each said rib of each said ground support pad half abuts squarely against a rib of the other said ground support half, said ribs being designed, constructed, and located to prevent said ground pad from tearing due to stress and to diffuse stress upon any portion of said ground support pad to all portions of said ground support pad.

2. The ground support pad of claim 1 wherein each said diagonal rib contains at least one interior male interlock and one interior female interlock such that upon engagement each interior male interlock of each said ground support pad half engages within a corresponding interior female interlock of the other said ground support pad half and each interior female interlock is engaged upon a corresponding interior male interlock such that such engaged interior interlocks maintain the abutting relationship between said corresponding diagonal ribs of said first and second ground support pad halves and prevents horizontal movement therebetween.

3. The ground support pad of claim 2 wherein outer pad surfaces have a rough exterior to prevent slippage between said ground support pad and either a medium upon which the ground support pad rests or a structure which said ground support pad is supporting.

4. The ground support pad of claim 3 wherein the ground support pad is composed of a base material consisting of polyolefin-homopolymer.

5. The ground support pad of claim 4 wherein the said base material additionally contains a blended percentage of stranded fiber for strength.

6. The ground support pad of claim 5 wherein the stranded fiber length does not usually exceed 0.250 inches and said fiber strands are dispersed uniformly throughout said ground support pad.

7. The ground support pad of claim 6 wherein the density of said base material is between 0.915 and 0.935 upon an ASTM standard of measure.

8. The ground support pad of claim 7 wherein the base material additionally contains a special ultraviolet inhibitor using an unfitted polyolefin as the ultraviolet inhibitor's basic carrier, said inhibitor and carrier constituting approximately 4% of the total base material.

* * * * *